1/7/86 OR 4,563,564

United States Patent [19]

Ericsen et al.

[11] Patent Number: 4,563,564

[45] Date of Patent: Jan. 7, 1986

[54] FILM RESISTORS

[75] Inventors: Bret Ericsen, Hillsboro; John C. Hastings, Aloha; Desmond L. Murphy, Portland; Scott Jansen, Beaverton, all of Oreg.

[73] Assignee: Tektronix, Inc., Beaverton, Oreg.

[21] Appl. No.: 575,239

[22] Filed: Jan. 30, 1984

[51] Int. Cl.⁴ ............................................ B23K 26/00

[52] U.S. Cl. ............................ 219/121 LJ; 29/610 R; 338/195

[58] Field of Search .................. 219/121 LH, 121 LJ, 219/121 EJ, 121 EK; 338/195; 29/610 R, 620

[56] References Cited

U.S. PATENT DOCUMENTS

| | | | |
|---|---|---|---|
| 3,947,801 | 3/1976 | Bube | 219/121 LJ X |
| 4,146,673 | 3/1979 | Headley | 219/121 LJ X |
| 4,184,062 | 1/1980 | Schmidt | 219/121 LH |
| 4,352,005 | 9/1982 | Evans et al. | 219/121 LJ |
| 4,403,133 | 9/1983 | Turner et al. | 219/121 LJ |

*Primary Examiner*—C. L. Albritton
*Attorney, Agent, or Firm*—John D. Winkelman; John Smith-Hill

[57] ABSTRACT

A resistor formed by a film of resistive material deposited on a dielectric substrate is trimmed by removing resistive material along a line such that the film is divided into at least two discrete areas, one, and only one, of which areas includes two terminal portions of the film.

4 Claims, 6 Drawing Figures

FILM RESISTORS

This invention relates to film resistors, and more particularly to a trimmed film resistor and a method of trimming a film resistor.

BACKGROUND OF THE INVENTION

FIG. 1 of the accompanying drawings illustrates a conventional RC attenuator network, such as may be used for coupling an input signal to a measuring instrument, e.g., an oscilloscope. The network comprises two resistors 2 and 4 connected in series between an input terminal 6 and ground, and two capacitors 8 and 10 connected in parallel with the resistors 2 and 4 and connected at their junction point to an output terminal 12. If the desired attenuation factor of the attenuator network is n, i.e., the amplitude of the output signal is 1/n times the amplitude of the input signal, then $R_2$ is equal to $(n-1)R_4$ and $C_8$ is equal to $(n-1)C_{10}$. The resistors 2 and 4 attenuate the d.c. component of the input signal, whereas the capacitors 8 and 10 attenuate the a.c. component.

It is well known to fabricate an RC attenuator network, such as that shown in FIG. 1, using thick or thin film technology. In such a case, each resistor comprises a film of resistive material deposited on a dielectric substrate, such as a ceramic material, within a predetermined boundary and extending between two spaced terminal portions of the film, at which the resistive material contacts film conductors which are also deposited on the substrate. In the case of thick film technology, the resistors and conductors are deposited on the substrate by a screen printing process using appropriate pastes. The screen printing process is also used to form the capacitors, connected to the resistors by conductors, on the substrate. The capacitance value of the capacitor 18 is trimmed or adjusted by active laser trimming. The d.c. resistance value of the resistor 2 is trimmed by passive laser trimming, which involves using a laser light beam to form a cut or kerf in the film, removing the resistive material along a predetermined line until the resistance value of the resistor attains the desired value.

FIG. 2A is a plan view of the resistor 2. The resistor has two terminal portions *2a* and *2b* at which it is connected to conductors 14 and 16 respectively. The resistance value of the resistor that is initially deposited on the substrate 3 is lower than the expected desired resistance value. Provided that the network has been properly formed, any departures of the d.c. properties of the network from the desired d.c. properties are attributable to the resistance of the resistor 2 being too low, and in order to bring the d.c. properties of the circuit to the desired level it is necessary only to increase the resistance value until it attains the proper level. This adjustment of the resistance value is accomplished by passive laser trimming. In accordance with this technique, a laser light beam is used to remove, by evaporation, material of the resistor along an L-shaped cut line 18 so as to increase the value of the resistance between the conductors 14 and 16. The limb **18*a* of the L lies wholly within the area of resistive material, while the other limb 18*b* extends to the boundary of the resistive material. Thus, the film is divided into two regions 20*a* and 20*b*. The region 20*a*** includes the portions *2a* and *2b* and is utilized in conducting the current between the conductors 14 and 16, whereas the region **20*b* is not available for conduction of current between the conductors 14 and 16**.

The equivalent circuit of the trimmed resistor is shown in FIG. 2B. It will be seen from FIG. 2B that the resistor 2 is composed of three resistances 22, 24 and 26 connected in series between the conductors 14 and 16, representing the area **20*a*, a parasitic resistance 28 connected between the resistances 24 and 26 and representing the area 20*b*, and a stray capacitance 30 across the laser cut and connecting the resistance 28 to the resistances 22 and 24. (The resistances 24 and 28 and the capacitance 30 are shown in distributed form.) The values of the capacitance 30 and resistance 28 (and also of the resistances 24 and 26) are dependent on the length of the laser cut 18*a*** necessary to establish the desired d.c. resistance value.

The RC time constant of the resistance 28 and capacitance 30 causes the resistor 2 to exhibit a form of the phenomenon known as geometric hook. Hook results in a distortion of the waveform of a signal passing through the resistor. Thus, if the signal applied to the input terminal of the attenuator network has the step-form of the waveform shown in FIG. 3, geometric hook may cause the signal developed at the output terminal to have the form of the waveform b in which the portion of the step just after the rising edge is distorted from the horizontal form of the input signal. The distortion may be up to about 3% of the signal amplitude. Geometric hook in the resistor 2 cannot readily be compensated for by adjustment of the other components of the attenuator network.

SUMMARY OF THE INVENTION

According to a first aspect of the present invention there is provided a method of trimming a resistor formed by a film of resistive material deposited on a dielectric substrate within a predetermined boundary and extending between two spaced terminal portions of the film, said method comprising removing resistive material from the substrate along a line such that the film is divided into at least two discrete areas, one of which areas includes both said terminal portions.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION

Figure 1:
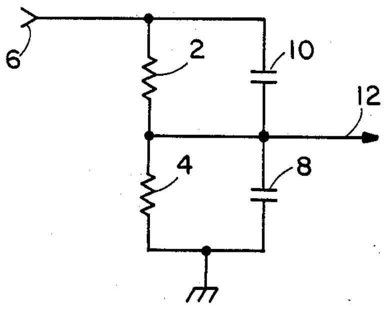
FIG. 1 is a schematic diagram of an RC attenuator network.
Figure 2A:
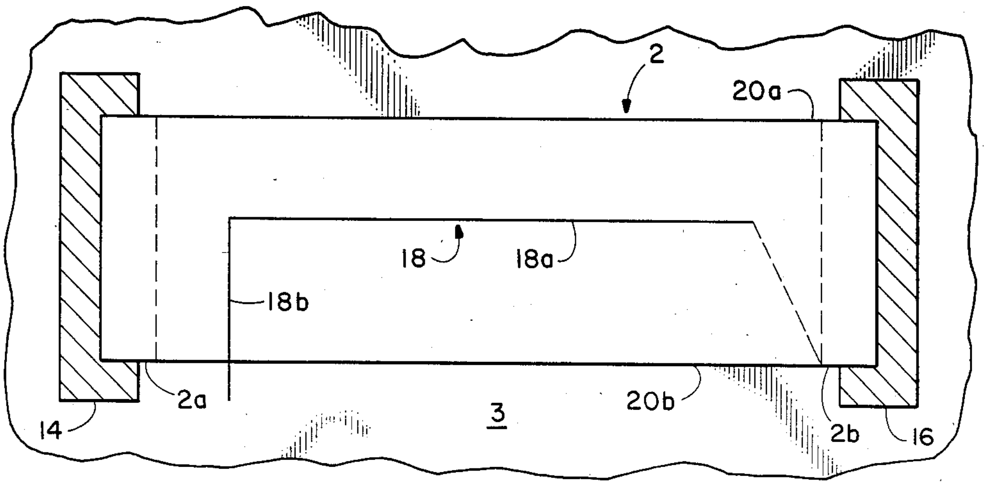
FIG. 2A illustrates a plan view of a component of the FIG. 1 network.
Figure 2B:
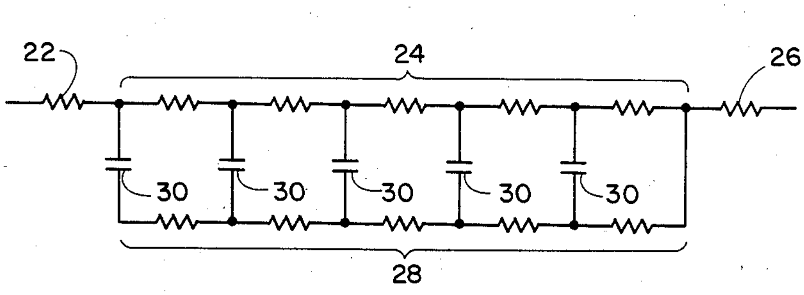
FIG. 2B is a schematic diagram of the equivalent circuit of the FIG. 2A component.
Figure 4A:
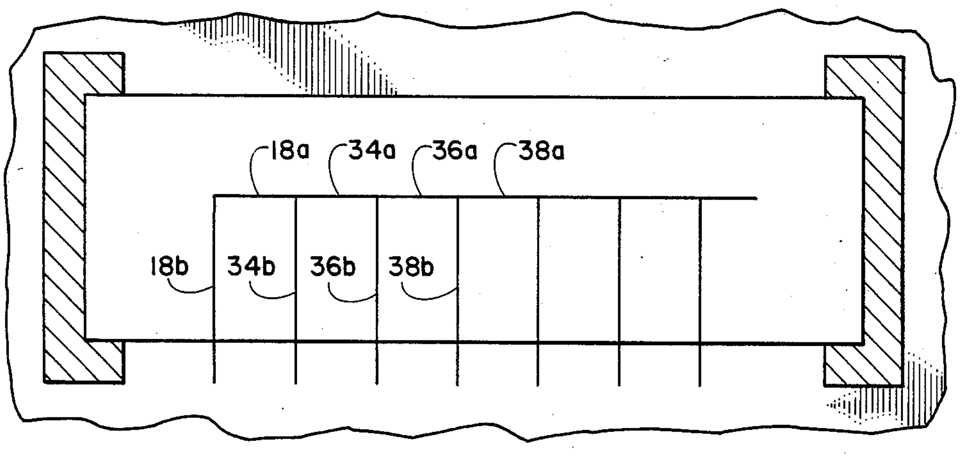
FIG. 4A illustrates an plan view of a second alternative form of the FIG. 2A component.
Figure 4B:
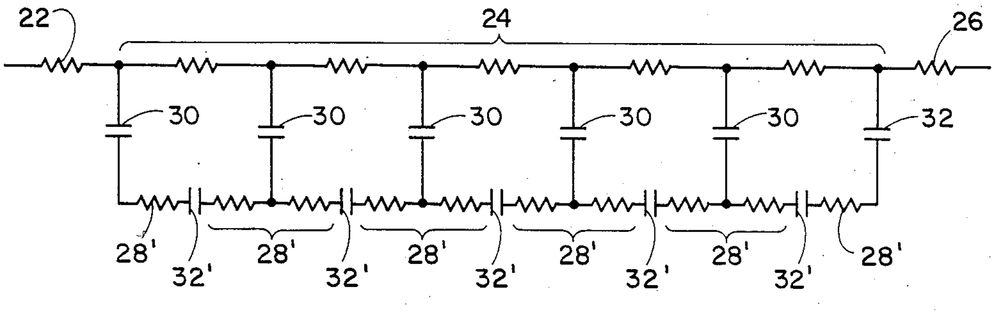
FIG. 4B is a schematic diagram of the equivalent circuit of FIG. 4A component.
Figure 3:
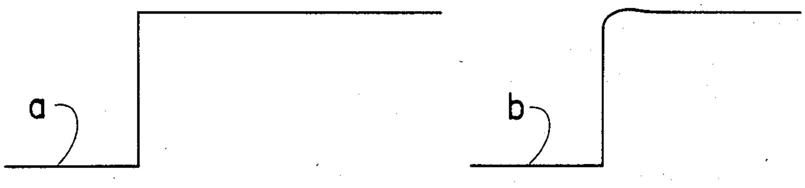
FIG. 3 illustrates waveforms of two signals.

FIG. 4A shows a resistor which has been trimmed in a manner which reduces the stray capacitance in series with the parasitic resistance 28 by dividing the region **20*b* into several portions 20*b*'. This is accomplished by programming the laser trimming apparatus in known manner to remove the resistive material from the film along cuts 34*b*, 36*b*, 38*b*, etc. parallel to the limb 18*b* of the L. The parasitic resistance 28 is thereby divided into a number of series resistance elements 28', corresponding to the number of cuts 34***b*, 36*b*, etc., and each resistance element is isolated from the adjacent resistance elements by capacitance elements 32' introduced by the cuts 34*b*, 36*b*, 38*b* etc. The d.c. connection to the parasitic resistance is thus broken up, and the stray capacitance in series with the parasitic resistance is reduced.

The resistor shown in FIG. 5A implemented by making a plurality of L-shaped cuts 18*a*, 18*b*; 34*a*, 34*b*; 36*a*, 36*b*; 38*a*, 38*b* etc. cut, the heel of the L of each cut being positioned at the free end of the limb a of the previous cut. The aggregate length of the limbs a is determined by the amount of resistor adjustment necessary to achieve the desired resistance value. The alternative method of It will be appreciated that the present invention is not restricted to the particular method and device which have been described, since variations may be made therein without departing from the scope of the invention as defined in the appended claims, and equivalents thereof. For example, although specific mention has been made of thick film technology, the invention is also applicable to resistors produced using thin film technology. On the other hand, it will also be appreciated that the invention is not generally applicable to ground plane resistors, i.e., resistors which have a substantial capacitance to ground.

We claim:

1. A method of trimming a resistor formed by a film of resistive material deposited on a dielectric substrate within a predetermined boundary and having two spaced terminal portions, said boundary having first and second opposite side portions that extend between the two terminal portions of the film, said method comprising removing resistive material from the substrate along a succession of generally L-shaped paths each having a first limb that extends from said first side portion of the boundary towards the second side portion thereof and terminates at a heel point intermediate the first and second side portions, and a second limb that extends from said heel point towards one of the two terminal portions of the film and terminates in a termination point, with the heel point of each succeeding L-shaped path essentially coinciding with the termination point of the preceding L-shaped path, whereby the film is divided into at least two discrete areas, only one of which areas includes both said terminal portions.

2. A method according to claim 1, wherein the first and second side portions are each generally straight and the second limb of each generally L-shaped path extends substantially parallel to said first side portion.

3. A method according to claim 2, wherein the first and second side portions are generally parallel and the first limb of each generally L-shaped path extends substantially perpendicular to said first side portion.

4. A resistor device manufactured by a method according to claim 1.

* * * * *